United States Patent
Voth et al.

(10) Patent No.: US 8,936,455 B2
(45) Date of Patent: Jan. 20, 2015

(54) BLOW MOLDING MACHINE WITH CLEAN ROOM AND STERILIZABLY CONNECTED COMPONENTS

(75) Inventors: Klaus Voth, Obertraubling (DE);
Florian Geltinger, Donaustauf (DE);
Michael Neubauer, Regensburg (DE);
Juergen Soellner, Beratzhausen (DE);
Josef Hausladen, Woerth/Donau (DE);
Eduard Handschuh, Regensburg (DE)

(73) Assignee: Krones AG, Neutraubling (DE)

( * ) Notice: Subject to any disclaimer, the term of this patent is extended or adjusted under 35 U.S.C. 154(b) by 323 days.

(21) Appl. No.: 13/409,105

(22) Filed: Mar. 1, 2012

(65) Prior Publication Data
US 2012/0223464 A1  Sep. 6, 2012

(30) Foreign Application Priority Data

Mar. 4, 2011 (DE) .......................... 10 2011 013 125

(51) Int. Cl.
*B29C 49/46* (2006.01)
*B29C 49/56* (2006.01)

(52) U.S. Cl.
CPC ............. *B29C 49/46* (2013.01); *B29C 49/56* (2013.01); *B29C 2049/4679* (2013.01); *B29C 2049/4697* (2013.01); *B29C 2049/563* (2013.01)
USPC .............. 425/73; 425/225; 425/522; 425/541

(58) Field of Classification Search
CPC ............ B29C 49/46; B29C 2049/4294; B29C 2049/4697
USPC ..................... 425/73, 225, 522, 541
See application file for complete search history.

(56) References Cited

U.S. PATENT DOCUMENTS

| | | | | |
|---|---|---|---|---|
| 4,208,852 A | * | 6/1980 | Pioch | ............................ 425/527 |
| 6,099,286 A | | 8/2000 | Nitsche | |
| 6,273,705 B1 | * | 8/2001 | Schoch | ......................... 425/535 |

(Continued)

FOREIGN PATENT DOCUMENTS

| | | |
|---|---|---|
| DE | 102007017938 B4 | 10/2008 |
| FR | 2813231 A1 | 3/2002 |
| WO | 2010/020529 A2 | 2/2010 |

OTHER PUBLICATIONS

English abstract for FR 2813231.

(Continued)

*Primary Examiner* — Robert B Davis
(74) *Attorney, Agent, or Firm* — Oppedahl Patent Law Firm LLC (57) ABSTRACT

A device for transforming parisons into containers with a plurality of transforming stations which are disposed on a movable carrier, wherein the transforming stations each have blow molds, within which the parisons can be transformed into containers by a supply of a flowable medium, and blow mold supports for holding these blow molds, wherein the blow mold supports have at least two blow mold support parts which are movable relative to one another for opening and closing the blow molds, with a clean room which is demarcated with respect to the surroundings by means of at least one wall and which at least partially surrounds the individual transforming stations, so that the transforming stations are movable within this clean room, and with at least one supply unit in order to supply flowable sterilizing medium to at least one region of the transforming stations which are movable within the clean room.

21 Claims, 6 Drawing Sheets

(56) References Cited

U.S. PATENT DOCUMENTS

| | | | |
|---|---|---|---|
| 6,729,868 B1* | 5/2004 | Vogel et al. | 425/522 |
| 2004/0013762 A1* | 1/2004 | Bianchini | 425/522 |
| 2005/0142243 A1 | 6/2005 | Tsau et al. | |
| 2009/0065980 A1* | 3/2009 | Baumgarte et al. | 425/526 |
| 2010/0089009 A1* | 4/2010 | Till | 264/446 |

OTHER PUBLICATIONS

European Patent Office search report dated Jul. 3, 2012 for EP 12 15 7956.9.

Search report dated Feb. 20, 2012 from German patent office in application No. 10 2011 013 125.6.

* cited by examiner

BLOW MOLDING MACHINE WITH CLEAN ROOM AND STERILIZABLY CONNECTED COMPONENTS

The present invention relates to a system for handling containers. The invention is explained with reference to a blow molding machine which transforms plastic parisons into plastic containers. However, it is also conceivable to apply the present invention to other machines for handling containers, such as for example sterilisation equipment.

Such blow molding machines have been known for a long time from the prior art. In this case in particular so-called aseptic blow molding machines are also known which serve for expansion of plastic parisons to form plastic containers under sterile conditions. Such sterile or aseptic blow molding machines are described for example in WO 2010 020 529 A2. A special challenge with such blow molding machines is to achieve the appropriate high level of cleanliness. In the USA for example such guidelines have been established and are monitored by the FDA (Food and Drug Administration). In this case it is conceivable in particular that germs remaining in the machine lead to contamination of the machine and also of the containers. The problem occurs in particular in the case of such components which have interconnected elements, with gaps between these elements which can only be cleaned with difficulty. The complete content of the disclosure of WO 2010 020 529 A2 is hereby incorporated by reference into the disclosure of the present application.

The object of the present invention therefore is to provide a blow molding machine which by comparison with the prior art is easier to clean and can be kept under sterile conditions. This is achieved according to the invention by a device as claimed in Claim 1. Advantageous embodiments and modifications are the subject matter of the subordinate claims.

A device according to the invention for transforming plastic parisons into plastic containers has a plurality of transforming stations which are disposed on a movable carrier, wherein the transforming stations in each case have blow molds, within which the plastic parisons can be transformed into plastic containers by the supply of a flowable medium. In addition the transforming stations also have blow mold supports to hold these blow molds and the blow mold supports have at least two blow mold support parts which are movable with respect to one another for opening and closing the blow molds. Furthermore the device has a clean room which is demarcated from the surroundings by means of at least one wall which at least partially surrounds the individual transforming stations so that the transforming stations are movable within this clean room. In addition at least one supply unit is provided in order to supply a flowable sterilising medium to at least one region of the transforming stations which are movable within the clean room.

According to the invention at least one transforming station has at least two components which are permanently fastened to one another in a working operation, and resilient sealing means is disposed between these components, wherein this sealing means fills and/or closes (or covers) a gap formed between these components in such a way that the sealing means can be supplied directly with the sterilising medium.

In this case the sealing means can preferably close the gap by filling it or covering it.

In devices which are known from the prior art with components fastened to one another in this way gaps may be formed, so that in these gaps germs may be located which would be protected against being killed by the narrow geometry in the gap during sterilisation of the machine for example by gaseous $H_2O_2$. The invention therefore proposes a possible way of hygienically connecting components, in particular in an isolator, which in particular is also advantageous with regard to the design of an aseptic blow molding machine. The sealing means in this case is designed in such a way that it can even be supplied directly with the sterilising medium and accordingly in the gap which is formed there can be no germs on the surfaces which cannot be reached by the sterilising medium.

Thus the sealing means advantageously forms a part of the surface which in particular forms a transition from the first structural part into the second structural part. Thus the sealing means can advantageously be formed on an external periphery of the surface which forms a transition from the first structural part into the second structural part.

The supply unit may for example be a nozzle or a spray head which supplies the components of the blow molding machine and in particular the individual transforming stations with the sterilising medium. This supply unit is advantageously disposed at least partially within the clean room. In this case this supply unit can move with the individual transforming stations, but it would also be possible for the supply unit to be disposed stationary and for the individual transforming stations to move past this supply unit. The device advantageously has a plurality of such supply units which are disposed in particular on the said carrier.

Thus the invention deals with the question of whether the components can be hygienically connected to one another in particular in a clean room. In particular components which are disposed flush on one another or screwed flush on one another should be avoided because this produces a gap in which germs can collect and multiply. The individual transforming stations are advantageously disposed on a common carrier, wherein this carrier is particularly preferably disposed so as to be rotatable. In a preferred embodiment the blow molding machine is a stretch blow molding machine, and therefore the individual transforming stations preferably have stretching rods which expand the plastic parisons in their longitudinal direction.

The sterile room advantageously surrounds a part of the transforming unit and also in particular the region in which the individual transforming stations are guided.

In a further advantageous embodiment a drive shaft of the device itself is not disposed in the sterile room. The sterile room advantageously surrounds the individual transforming stations in the form of a channel. In this case the sterile room can have two walls which are movable relative to one another, wherein advantageously these two walls are sealed against one another, for example using a so-called water lock.

A region of the above-mentioned seal or of the sealing means is advantageously visible in the sterilisation direction, i.e. in the direction from which the sterilising medium is supplied.

In a further advantageous embodiment the said components are releasably connected to one another, for example screwed.

The sealing means is advantageously not a flat seal, since this makes it difficult to ensure sufficient pressure for sealing on all points over the relatively large sealing surface. In a further advantageous embodiment the sealing means is formed peripherally, i.e. a predetermined region of the components disposed against one another is preferably surrounded by this sealing means. This surrounded region may also be of unsterile or unsterilisable design.

In this case in particular for releasable seals so-called O-rings, i.e. annular sealing elements, are used, wherein these O-rings can be inlaid in a special groove which is located in one of the two components and which is then joined to the respective other component, for example screwed into it. However, "annular" is understood to include cross-sections which deviate from a circular cross-section, for example oval cross-sections, rectangular cross-sections with rounded corners and the like.

However, circular sealing means are advantageously used. For manufacturing reasons it is advantageous for the groove also to be introduced in circular form into the component, since it can then be produced relatively simply, for example by turning. However it would also be possible for the respective grooves to be milled.

In a further advantageous embodiment the device has a plurality of sealing means which can be supplied directly with the sterilising medium.

Thus a plurality of components are advantageously connected to such sealing means, so that as a whole the sterilisation can be accomplished relatively easily.

As mentioned above, at least one of the components advantageously has a receiving recess to accommodate the sealing means. In this case this receiving recess is advantageously formed as a receiving groove.

It is particularly preferred for the receiving recess to be formed peripherally.

It is particularly preferred one or more O-rings to be used for sealing. In a further advantageous embodiment the recess is formed as a flush groove, wherein during connection of the components in particular a region of the sealing means is forced outwards or in the direction of the regions supplied with the sterilising medium. In a further advantageous embodiment at least one of the sealing means is a shaft sealing ring.

In a further advantageous embodiment the receiving recess has boundary walls, wherein these boundary walls have different heights with respect to the base of the receiving recess. Thus in contrast to the prior art these recesses are not configured symmetrically with regard to their height, but asymmetrically. In this case it is possible that during assembly of the components a region of the sealing means is forced at least partially over one of these boundary walls and in particular the lower boundary wall.

At least one sealing means is advantageously made from an elastomer. The sealing means advantageously contacts the two components disposed against one another and in the installed state of the two components the sealing means is preferably fixed with respect to both components.

In a further advantageous embodiment, in the installed state of the component the sealing means has an asymmetrical cross-section.

In a further advantageous embodiment, in particular those gaps which are caused by components extending through an isolator wall or clean room (such as for example the shaft of the movable mold support or the locking shaft) are sealed against the surroundings with the aid of shaft sealing rings. However it would also be possible to use other seals instead of or as well as shaft sealing rings.

In a further advantageous embodiment wear parts are also sealed against the next component with the aid of one or more seals, such as for example O-rings or flat seals.

In a further advantageous embodiment screw connections between the said components are sealed in particular with the aid of so-called Usit discs. Such Usit discs are metal discs onto which a sealing bead, made for example from resilient rubber, is vulcanised, glued, screwed or fastened in some other way.

More precisely, a sealing lip made from an elastomer material is formed on the periphery of these metal discs. Screw heads for example can be sealed with the aid of such discs.

The sealing discs can be made from a metal, for example stainless steel. The sealing lips can be made for example from an elastomer. In further embodiments these sealing discs are made from other materials, for example from a plastic with attached sealing lip. Depending upon the purpose for which it is to be used, this sealing lip can be disposed on an inner or on an outer diameter.

In a further advantageous embodiment at least one of the said components has at least one cylindrical raised area for connecting to the other component. Usually not all components to be connected have circular contact surfaces to the respective next component, and for this reason sealing by means of O-rings is sometimes difficult. As a solution to this problem it is therefore proposed to provide cylindrical raised areas on the relevant components, and again these can be provided with a round O-ring groove. Wear parts, in particular parts of the locking mechanism which should be replaced regularly, can also be fastened in this way.

In a further advantageous embodiment the first component is a mold support and the second component is a blow mold part. Such blow molds for stretch blow molding machines usually have a half-round cross-section. They are inserted into a mold support and are fixed therein. In this way a gap with a relatively large surface area is produced. Because of the manufacturing tolerances this gap may have a thickness of 0 mm to several $1/10$ mm. However, in the construction of an aseptic blow molding machine such gaps within the sterile zone should be avoided since, as mentioned above, germs can build up there which would be protected against being killed by the narrow geometry in the gap during sterilisation of the machine.

The simplest possibility for preventing the gap is sealing. In this case the sealing means may be located between the blow mold and the mold support, wherein the mold support is understood to be the machine component in which the blow mold is used. As mentioned above, the sealing means may have a circular cross-section, or may also be designed as a lip seal. However, other cross-sections would also be possible. In addition it is also possible to use a hollow chamber section which may optionally be inflated with the aid of an internal pressure for better sealing after insertion of the mold. In order to receive the sealing means special mold elements, such as grooves or cutouts, which ensure the correct seating and the fixing of the sealing means, can be optionally provided on the mold and/or the mold support. In an advantageous embodiment the sealing surface is flat, so that manufacture is simplified.

In a further advantageous embodiment delivery means for delivering a temperature control medium are disposed within a section surrounded by the sealing means. In this case this temperature control medium may serve for cooling or heating the blow mold support or also the blow mold. Thus in particular inside the section surrounded by the sealing means it is unsterile. This leads to certain regions of the transforming stations within the sterile room being unsterile, wherein these unsterile regions are however sealed with respect to the sterile room. The region of the respective component lying in this case outside the sealing means is again advantageously sterilisable.

In a further advantageous embodiment the blow mold has a recess to receive a region of the blow mold support which can be temperature-controlled. This recess serves in particular for cooling the blow mold. In this way it is possible that the blow mold itself operates without temperature control medium channels and its temperature can only be controlled by contact with the blow mold support.

In a further advantageous embodiment the blow mold has a flat rear face.

Furthermore the present invention is directed to a method for transforming plastic parisons into plastic containers. In this case a plurality of transforming stations are provided which are disposed on a movable carrier, wherein the transforming stations in each case have blow molds within which the plastic parisons can be transformed into plastic containers by the supply of a flowable medium. Blow mold supports are also provided for holding these blow molds, wherein at least blow mold support parts of these blow mold supports are moved relative to one another for opening and closing the blow molds.

In addition a clean room is provided which is demarcated with respect to the surroundings by means of at least one wall and which at least partially surrounds the individual transforming stations, wherein the transforming stations are moved within this clean room moves are and at least one supply unit is provided in order to supply a flowable sterilising medium at least to a region of the transforming stations moving within the clean room.

According to the invention at least one transforming station has at least two components which are permanently fastened to one another in a working operation, and a resilient sealing means is disposed between these components, wherein this sealing means fills and/or closes a gap formed between these components in such a way that the sealing means can be supplied directly with the sterilising medium.

In this case it is possible for both components to be rigidly fastened to one another, but it would also be possible for both components to be fastened to one another but so as to be movable relative to one another.

Therefore in terms of the method it is proposed that the sealing means itself is supplied with a sterilising medium and therefore likewise gaps between the components, in which germs can collect and/or multiply, are prevented.

Further advantages and embodiments are apparent from the appended drawings. In the drawings.

Figure 1:
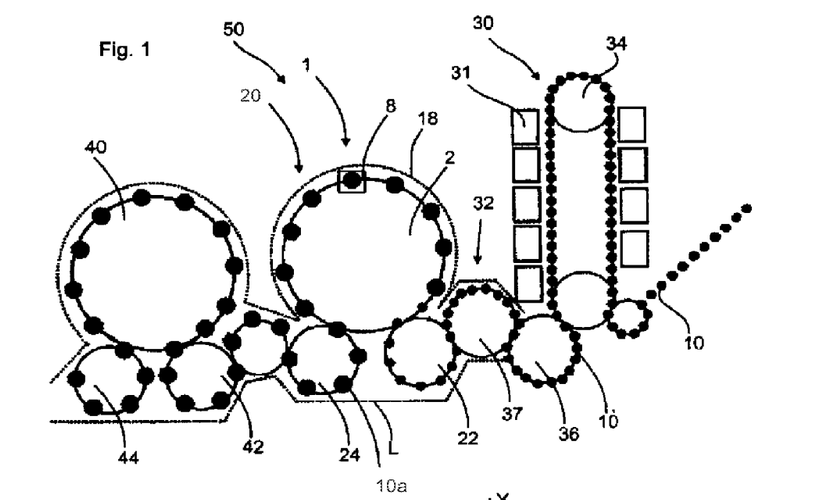
FIG. 1 shows a schematic representation of a system for producing plastic containers.

FIG. 1 shows a schematic representation of a system for producing plastic containers. This system 50 has a heater 30 in which plastic parisons 10 are heated. In this case these plastic parisons 10 are led through this heater 30 by means of a transport device 34, such as in this case a circulating chain, and in this case is heated by a plurality of heating elements 31. A transfer unit 36 which transfers the parisons 10 to a sterilising unit 32 adjoins this heater 30. In this case the sterilising unit 32 also has a transport wheel 37 and sterilising units can be disposed on this transport wheel 37 or also stationary. In this region sterilisation is possible for example by hydrogen peroxide gas or even, as mentioned above, by electromagnetic or UV radiation. In particular an internal sterilisation of the parisons is carried out in this region.

The reference sign 20 designates overall a clean room of which the outer boundaries are indicated here by the dotted line L. In a further preferred embodiment the clean room 20 is not disposed in the region of the transport wheel 2 and the filling unit 40, but may already begin in the region of the heater 30, the sterilising unit 32, the delivery of plastic parisons and/or the production of plastic parisons. It will be recognised that this clean room 20 begins in the region of the sterilising unit 32. In this region air lock means can be provided in order to introduce the plastic parisons into the clean room 20 without that too much gas flowing out of the clean room 20 and so being lost.

As indicated by the broken line L, the clean room 20 is adapted to the external shape of the individual system components. In this way the volume of the clean room can be reduced.

The reference sign 1 designates overall a transforming device in which a plurality of blow stations 8 is disposed on a transport wheel 2, only one of these blow stations 8 being illustrated here. With these blow stations 8 the plastic parisons 10 are expanded to form containers 10a. Although here not shown here in detail, the entire region of the transport device 2 is not located within the clean room 20, but the clean room 20 or isolator is to a certain extent provided as a mini-isolator within the entire device. Thus it would be possible for the clean room to be of channel-like construction at least in the region of the transforming device 1.

The reference 22 relates to a delivery unit which transfers the parisons to the transforming unit 1 about and the reference sign 24 relates to a discharge unit which discharges the produced plastic containers 10a from the transforming device 1. It will be recognised that in the region of the delivery unit 22 and the discharge unit 24 the clean room 20 has recesses in each case which contain these units 22, 24. In this way a transfer of the plastic parisons 10 to the transforming device 1 or a take-up of the plastic containers 10a from the transforming device 1 can be achieved in a particularly advantageous manner.

The expanded plastic containers are transferred to a filling unit 40 by a transfer unit 42 and from this filling unit 40 they are then discharged via a further transport unit 44. In this case the filling unit 40 is also located within the said clean room 20. Also in the case of the filling unit it would be possible that the entire filling unit 40 with for example a reservoir for a drink is not disposed completely within the clean room 20, but here too only those regions through which the containers actually pass. In this respect the filling unit could also be constructed in similar way to the device 1 for transforming plastic parisons 10.

As mentioned, in the region of the device 1 the clean room 20 is reduced to the smallest possible region, namely essentially to the blow stations 8 themselves. Due to this compact configuration of the clean room 20 it is possible to actually produce a clean room more easily and quickly, and also keeping it sterile in the operating phase is less complex. Also less sterile air is required, which leads to smaller filter systems and also the risk of uncontrolled turbulence is reduced.

Figure 2:
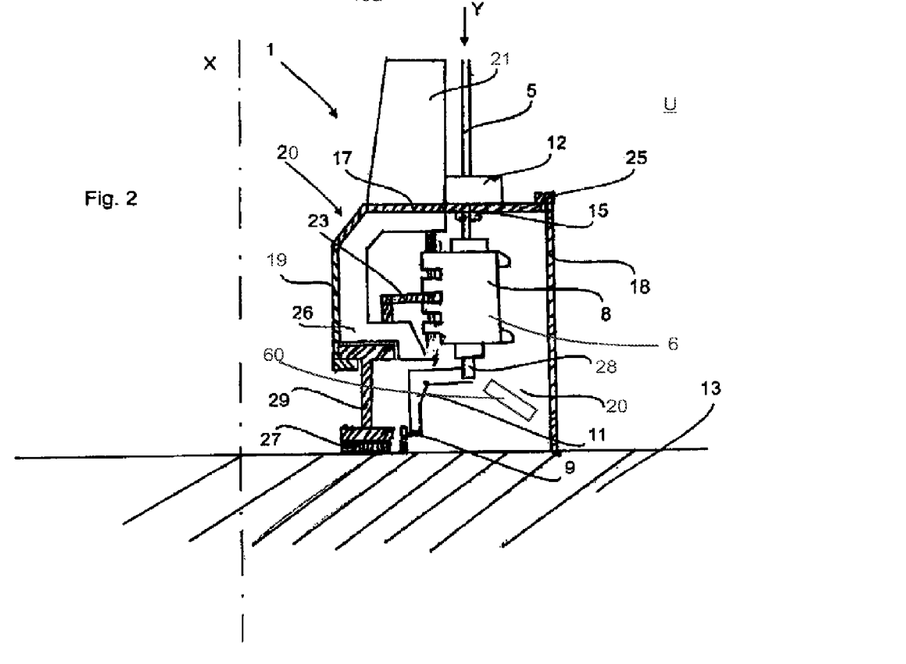
FIG. 2 shows a view of a clean room in the region of a blow station.

FIG. 2 shows a detail of the device 1 in the region of a blow station 8. A plurality of such blow stations 8 is moved rotatably about an axis X by a transport device 2 (i.e. the carrier 2). As can be seen in FIG. 2, the blow station 8 is guided within the clean room 20, which in this case is of channel-like design. This clean room 20 is closed off by a movable side wall 19 and a cover 17 formed integrally with this side wall 19. In this case the side wall 19 and the cover 17 rotate with the blow station 8.

The reference sign 18 relates to a further wall which demarcates the clean room 20. This wall 18 is here an external wall which is disposed stationary. Between the cover 17 and the wall 18 there is provided a sealing means 25 by which the elements 17 and 18 which are movable with respect to one another are sealed against one another, for example using a water lock, as mentioned above. The lower region of the wall 18 is disposed so as to be fixed and to form a seal on a base 13. A carrier 26, which is also moved rotatably and on which a holding unit 23 which holds the blow station 8 is provided, is provided within the clean room 20 where it bears directly against the wall 19.

The reference sign 11 relates to a follower device which can be actuated by a guide curve 9 in order to open and close the blow station on its way through the clean room 20 in order in particular to introduce the plastic parison into the blow station and also to remove it again. In this case is a guide curve 9 is also disposed within the clean room 20. However it would also be possible for example for a portion 28 to extend below the individual blow station 8 out of the clean room 20.

In this case the guide curve could for example be disposed below the clean room 20 and/or also could be laterally offset with respect to the clean room 20 or also above the clean room 20.

The transport device 2 can have further elements which are disposed above the clean room 20.

In this case the carrier 26 is fixed on a holding member 29 and this holding member is in turn movable with respect to the base 13. In this case the reference sign 27 relates to a further sealing means which in this region also produces a seal between regions 13 and 29 which are movable with respect to one another.

The reference sign 5 relates to a stretching rod which is movable with respect to the blow station in order to stretch the plastic parisons 10 in their longitudinal direction. In this case a carriage 12 is disposed on the cover 17 and the stretching rod is movable in the direction Y relative thereto. The reference sign 21 relates to a further holder for this carriage 12 of the stretching rod 5.

It will be recognised that during the blow molding process certain regions of the stretching rod 5 are both outside the clean room 20 inside the clean room. For this purpose it is possible to provide outside the clean room 20 or above the carriage 12 a protective device such as a folding bellows which surrounds the stretching rod 5 so that no region of the stretching rod 5 comes into direct contact with the external environment.

The individual blow stations or transforming stations 8 each have blow mold supports 6 on, within which the blow molds (not shown in FIG. 2) are disposed. As known in the prior art, these blow mold support can have two blow mold support parts which are pivotable relative to one another by means of a common pivot shaft 3 for opening and closing the blow mold.

The reference sign 60 here identifies a supply unit which serves to supply the transforming stations with the flowable sterilising medium. This supply unit 60 can be located on the transport wheel 2 or on the stationary wall 18 or generally stationary and can have nozzles or the like. It is also advantageous for sterile air for sterilising the clean room 20 to be introduced into the clean room 20 via the ventilation system.

Alternatively or additionally, however, the supply unit could also be a device which supplies the transforming stations with (in particular electromagnetic) radiation, e.g. UV or electron radiation. In this case it would be advantageous if in an assembled state of the components at least one region of the sealing means can be reached by this electromagnetic radiation.

The two components connected to one another are now disposed within the sterile room. Several examples of components disposed against one another according to the invention are set out below. Thus for example the components could be a blow mold support a blow mold disposed thereof or also components of a closing mechanism which disposed against one another are for closing the blow mold. In general, however, the invention can be applied to any components, particularly those disposed against one another within the sterile room, but also to components which are disposed on an (inner) wall of the sterile room or components disposed partially outside and partially inside the sterile room. The reference sign U in FIG. 2 relates to (unsterile) surroundings of the clean room 20.

However (unlike the illustration in FIG. 2) it would also be possible and preferable for the transport device 2 or the carrier to have a C-shaped outer periphery which also in part forms the outer walls of the clean room. Thus this C-shaped clean room wall rotates by the transport device 2, i.e. the blow wheel. In this embodiment s the lower boundary of the clean room is spaced apart from the base 13 spaced and moves relative to the base. In this way the clean room can be smaller than shown in FIG. 2. Sealing of this C-shaped section of the transport device, which here forms both an inner wall and a lower and upper cover of the clean room, preferably takes place here only with respect to the outer wall of the clean room. In this case this outer wall is advantageously stationary.

Figure 3:
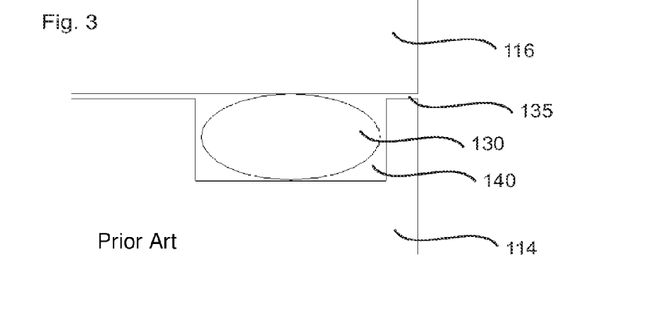
FIG. 3 shows the connection of two components according to the prior art.

FIG. 3 shows a connection between two components 114, 116 according to the prior art. A resilient sealing means 130 for example in in the form of an O-ring is disposed between these two components. However during connection of the two components 114, 116 a gap 135 may remain in which germs can collect. If the components are now supplied with a sterilising medium it is possible that this sterilising medium cannot reach the germs located in the gap 135 and so cannot kill them. In this way it cannot be guaranteed that a corresponding machine is germ-free. The reference sign 140 identifies a recess or groove in which the sealing means 130 is disposed.

Figure 4A:
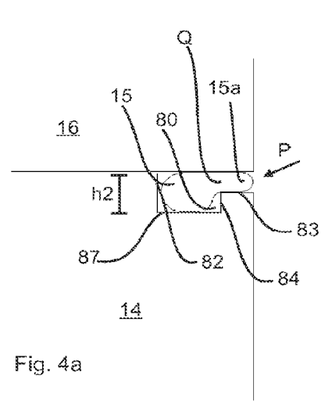
FIGS. 4a, 4b shows two representations to illustrate a connection of two components according to the invention.
Figure 4B:
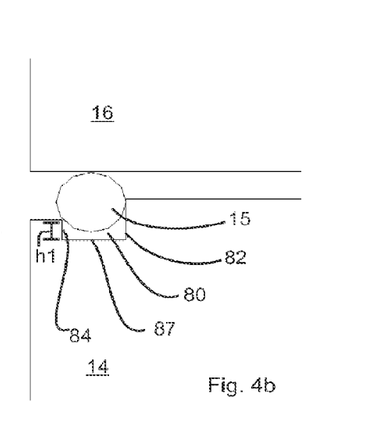

FIGS. 4a and 4b show a connection of two components 14, 16 according to the invention. It will be recognised that here too a sealing means 15 is disposed between the two components, more precisely in a recess 80 in the first component 14. FIG. 4b shows the state in which the components 14 and 16 are not firmly connected to one another. The sealing means 15 here is not yet in a tensioned state. In the situation shown in FIG. 4a shown the two components are firmly disposed against one another. It will be recognised that a region 15a of the sealing means is pushed in between the two components 14 and 16 in such a way that this region also cannot be reached by a sterilising medium supplied along the arrow P.

This can be achieved by the special configuration of the recess 80. It will be recognised that the side walls 82, 84 of the recess 80 have different heights h1 and h2 with respect to the recess base 87. In this way it is possible that the sealing means, the diameter of which is substantially greater than the height h2 of the side wall 84, is forced over this side wall or the upper section 83 of this side wall and so is forced outwards. In an assembled state this results in the asymmetrical profile or the asymmetrical cross-section Q of the sealing means shown in FIG. 4a.

Figure 5:
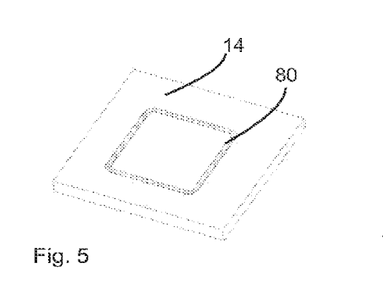
FIG. 5 shows a representation of a component with a recess for a sealing means.
Figure 6:
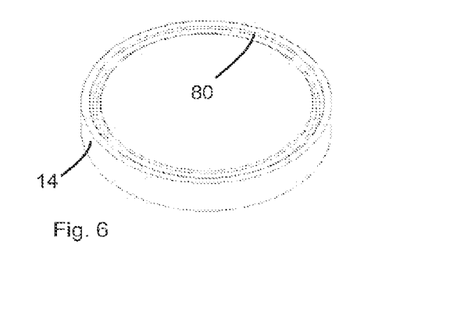
FIG. 6 shows a further representation of a component with a recess for a sealing means.

FIGS. 5 and 6 show two possible embodiments of recesses 80 which are disposed in the component 14. The recess 80 in FIG. 5 is rectangular with rounded corners. The recess 80 in the case of FIG. 6 is round. However, it is possible for the recess also to have other shapes, for example generally polygonal shapes, elliptical shapes and the like.

Figure 7A:
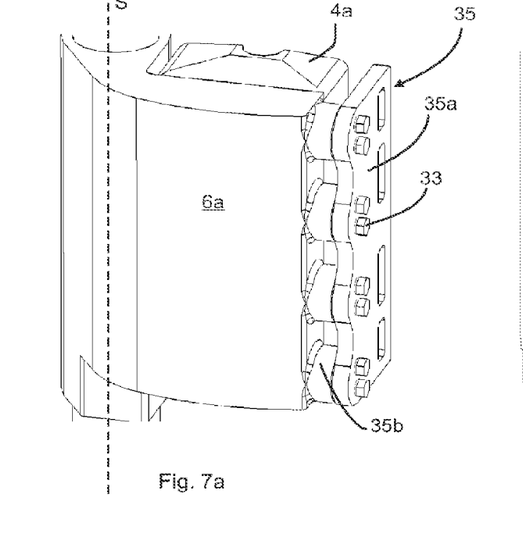
FIGS. 7a, 7b shows two representations of an embodiment of a seal.
Figure 7B:
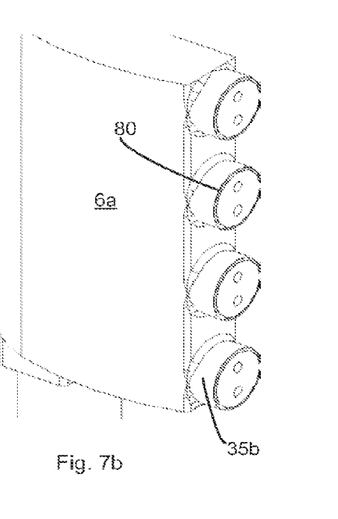

FIGS. 7a and 7b show two possible embodiments of sealing means according to the invention within the clean room. In this case a blow mold 4 or a blow mold part 4a is disposed on the blow mold support 6 or on the blow mold support 6a. The reference sign 35 identifies a locking mechanism which is disposed on the blow mold support 6a. In this case a locking plate 35a is releasably disposed on a plurality of projections 35b with a plurality of screws 33. It will be recognised that in this case gaps may be produced in which germs can collect. For this reason the individual projections 35 have been shown as raised areas which, as shown in FIG. 7b, can be provided comparatively easily with the recesses 80 for introduction of the sealing means. The reference sign S identifies a pivot axis about which the blow mold support 6a by the blow mold 4 is pivotable.

Thus in this embodiment the raised area 35b constitutes the first component and the locking plate 35a constitutes the second component which are connected to one another.

Figures 8, 9:
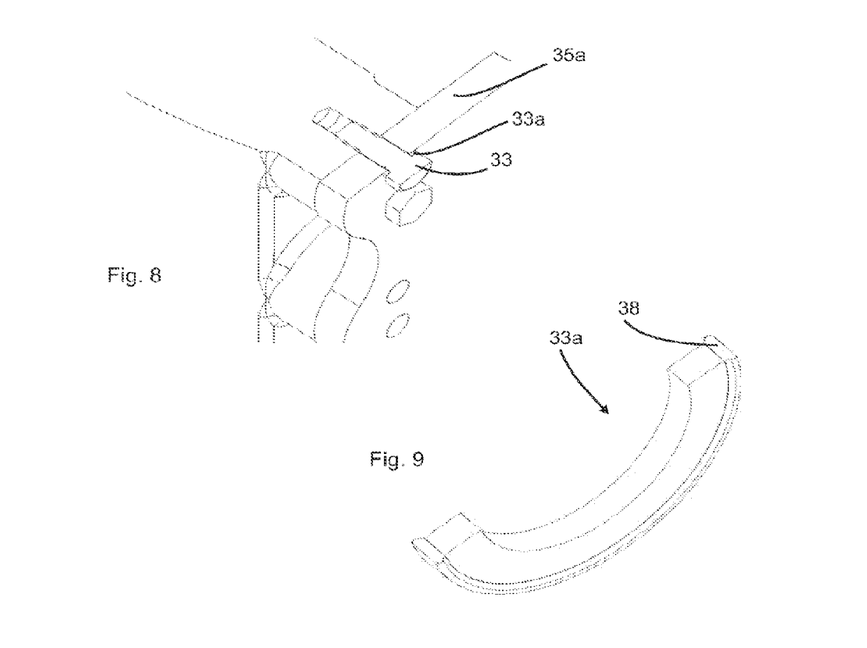
FIG. 8 shows a further representation of an inventive embodiment of a sealing means.
FIG. 9 shows a further embodiment of a sealing means according to the invention.

FIG. 8 shows a detail of the screws 33. Below these screws 33 resilient sealing discs 33a are disposed at least in some regions, and these screws in turn function as sealing means, so that the formation of gaps is also prevented between the screws 33 and the locking plate 35a. Thus in this case the screw 33 constitutes the first component and the locking plate 35a constitutes the second component.

FIG. 9 shows a representation of the sealing disc 33a. As shown in FIG. 9, a sealing lip 38 which projects beyond the sealing disc 33a on both sides relative to a surface plane is disposed on this sealing disc 33a. In this case the sealing means 38 or the sealing lip 38 can be vulcanised on the sealing disc 33b. In this case the sealing lip takes on the function of the sealing means 15.

Figure 10:
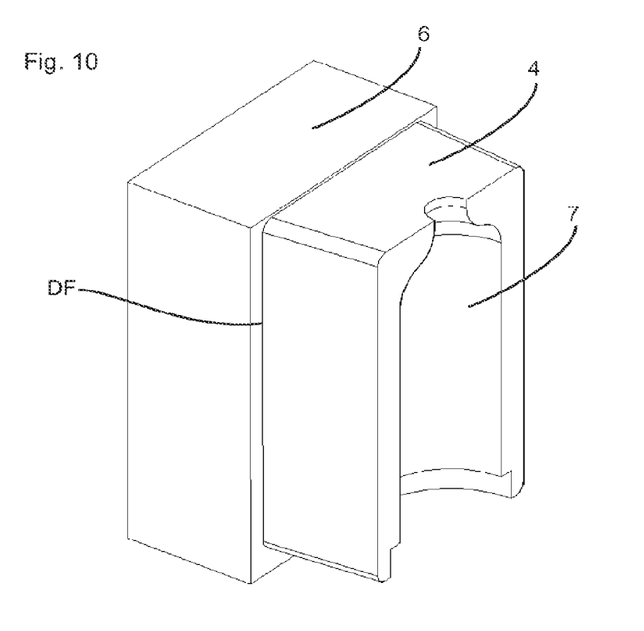
FIG. 10 shows a partial view of a blow mold support with a blow mold disposed thereon.

FIG. 10 shows a view of a blow mold support with a blow mold 4 disposed thereon. The reference sign 7 identifies a cavity within which the plastic parisons are expanded to form plastic containers. In this case, as mentioned above, between the blow mold 4 and the carrier gaps can also be produced in which germs can collect and multiply. The reference sign DF identifies the resulting sealing surface. If this sealing surface is for example flat this can simplify manufacture. As mentioned, however, this embodiment may have disadvantages.

Figure 11:
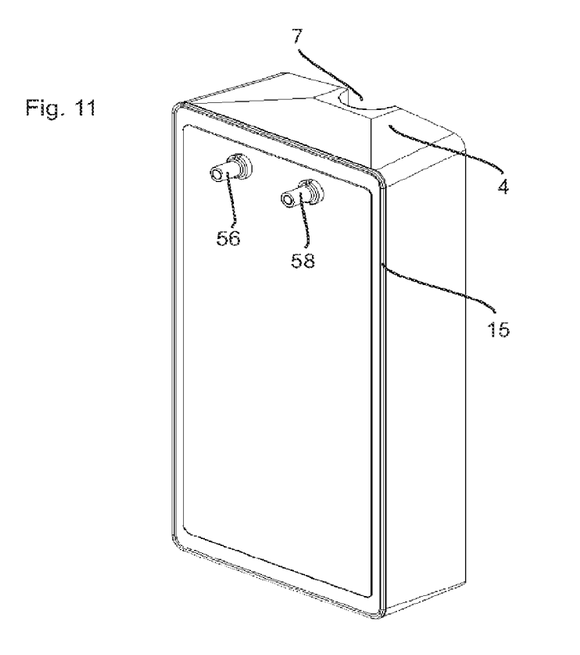
FIG. 11 shows a back view of the blow mold shown in FIG. 10.

FIG. 11 shows a further representation of the blow mold 4. The peripheral sealing means 15 can again be seen here. Furthermore two connections 56 and 58 are provided for example for temperature control of the blow mold. Corresponding cooling bores can be disposed in the blow mold support 6 shown in FIG. 10. However, if corresponding cooling bores are placed in the mold support 6 then they are relatively far away from the surface to be cooled, namely the bottle geometry. As a result the heat transfer is impaired. On the other hand the cooling bores would have to be located in the blow mold 4, which is why the following solution is proposed. Since the blow mold 4 is an interchangeable part couplings are necessary in the medium delivery system. From the hygienic point of view it is advantageous if these couplings 56 and 58 are disposed on the contact surface between the blow mold 4 and the blow mold support 6. In this case this surface is sealed by the peripheral sealing means 15 shown in FIG. 11, and therefore it is not essential for it to be sterile it but may be regarded as an unsterile region.

However, because of these integrated cooling bores in the medium couplings the molds, of which several sets are usually held for different bottle sizes and shapes, are more expensive.

Figure 12:
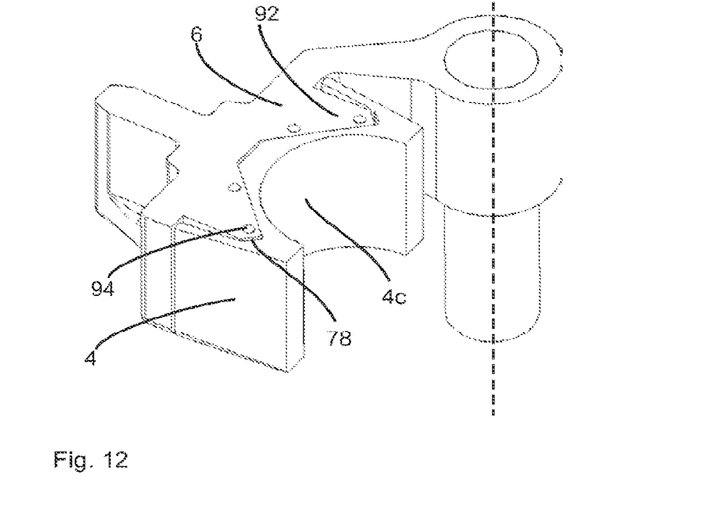
FIG. 12 shows a further embodiment of a blow mold holder with blow mold.
Figure 13:
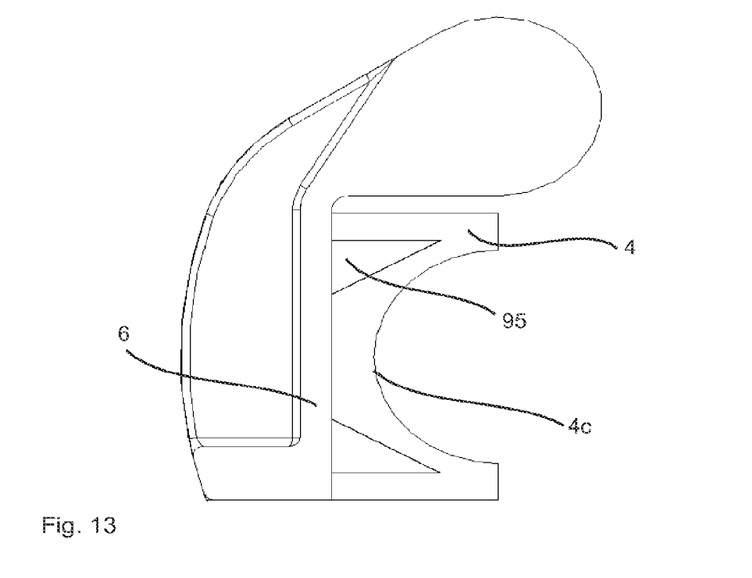
FIG. 13 shows a further embodiment of a blow mold holder with blow mold.

FIGS. 12 and 13 show an embodiment to circumvent this problem. It will be recognised that the blow mold support 6 here has projections 92, and furthermore cooling medium bores 94 are also disposed in the blow mold support 6. In this embodiment there are no cooling medium bores in the blow mold 4 itself, and therefore the blow mold is temperature-controlled or cooled via the blow mold support. Nevertheless, due to the constructions with the projections 92 which extend very close to the wall 4c of the blow mold, efficient cooling of the blow mold is possible. The sealing means described above can be disposed between the blow mold 4 and the carrier 6. The reference sign 78 identifies recesses which are formed in the blow mold and into which the said projections 92 protrude. The reference sign S identifies the pivot axis about which the blow mold support 6 is pivotable.

Alternatively it would also be possible to configure the blow mold 4 with a level rear face. In order to ensure good heat dissipation here, heat conducting elements 95 (cf. FIG. 13) can be integrated into the blow mold. These heat conducting elements are advantageously firmly integrated into the mold. In this case these heat conducting elements 95 advantageously have an improved thermal conductivity on may for example be made from copper or the like. By means of these heat conducting elements 95 the temperature of the blow mold support can be simply transported to the blow mold 4 or to the inner wall 4c of the blow mold which is to be temperature-controlled.

In a further embodiment it would also be possible for the sealing means shown in FIG. 11 to be round, which is advantageous in particular with regard to production.

Figure 14:
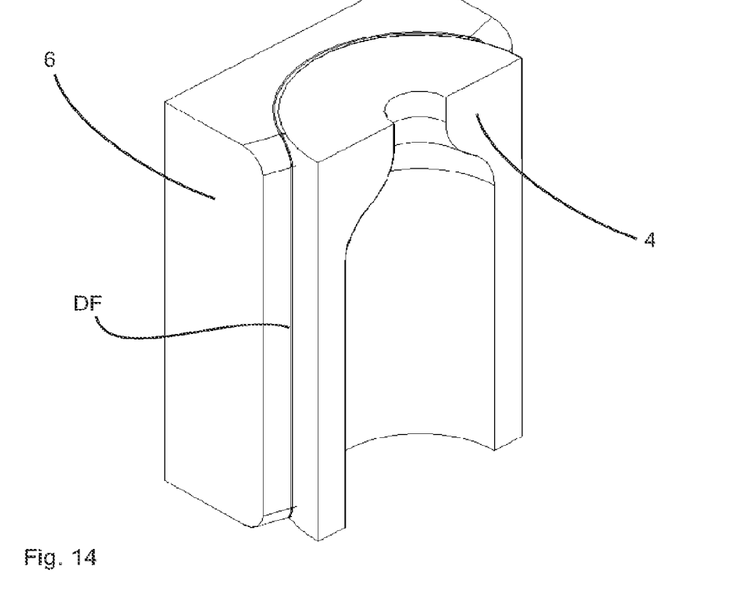
FIG. 14 shows a representation of an arrangement with a blow mold on a blow mold support.

FIG. 14 shows a further such embodiment of the sealing means. As shown in FIG. 14, a sealing surface is again produced between the blow mold 4 and the blow mold support 6, and should be sealed by a peripheral sealing means. Here too the sealing means can be constructed in the configuration shown in the above-mentioned FIGS. 4a and 4b. In this way the gap is sealed and no longer constitutes microbiological risk. However, the embodiment shown in FIG. 14 may also be designed without a sealing means.

Figure 15:
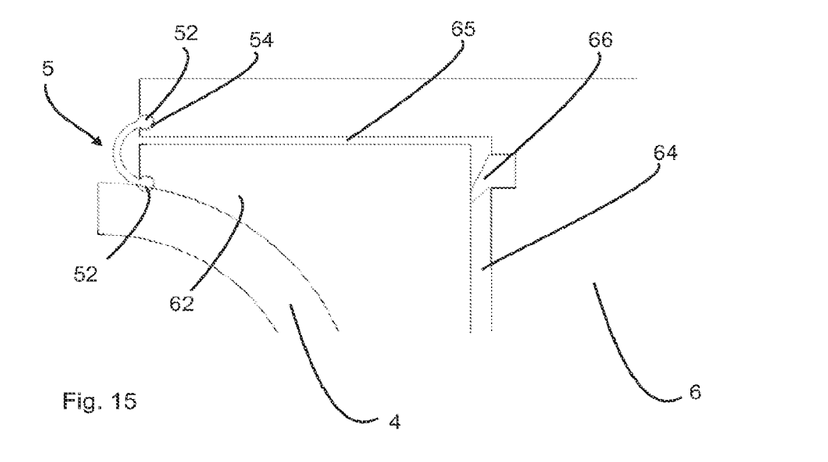
FIG. 15 shows a further embodiment of a device according to the invention.

FIG. 15 shows a further representation of the present invention. In this case a sealing means 5 is disposed between the blow mold 4 and the blow mold support 6, more precisely between the blow mold support 6 and a blow mold support shell 62. This sealing means extends perpendicular to the drawing plane. In this case the blow mold 4 is firmly disposed on this blow mold support shell 62. Between the blow mold support shell 62 and the blow mold support 6 a gap 64 is formed which can be supplied with compressed air. In this way is a so-called pressure pad is formed which presses one of the two blow mold parts (only one is shown) onto the other during the blow molding process. This means that when supplied with compressed air the blow mold 4 and the blow mold support 6 move slightly apart. Thus a pressure pad is located in the blow mold support, causing the mold support shell 62 to move forwards and backwards in operation, so that a relative movement between the mold support and the mold support shell is produced. As already mentioned, for hygienic reasons this gap must also be sealed.

The reference sign 66 relates to a sealing means which covers the gap 64. If air nevertheless passes through this gap it still does not reach the clean room but is held back by the sealing means 5. Thus the sealing means 5 completely covers the gap 64 and also the intermediate gap 65, so that in this region too no germs can collect.

During the sterilisation process the sealing means, or more precisely the outer face thereof, is supplied with the sterilising medium. Overall therefore the function of the sealing means 5, which seals the blow mold 4, is expanded. This sealing means extends as far as the blow mold support 6 and so bridges the gap 65 between the blow mold support and the mold support shell 62. In this way it is possible to seal two sealing locations with only one sealing means 5. However, a corresponding configuration is also possible if no pressure pad is provided, for instance on the side of the other blow mold part (not shown). Here too it is possible to seal a gap which is produced between the blow mold and a part accommodating the blow mold, and also a further gap. In this embodiment it is conceivable that the blow mold 4 does not lie in a mold support shell 62 but is disposed directly on the blow mold support.

Therefore in the case of these embodiments shown in FIG. 15 it is proposed that the sealing means seals more than one gap.

In the embodiment shown here the sealing means is disposed with two portions 52 in respective grooves 54. Between these end portions the sealing means 5 is of flexible construction. However, other possible means of fixing would be conceivable. The sealing means 5 could also be clamped in, for instance by screws or by a strip gripped by screws. Fixing could also take place by means of a tension band.

An advantage of the embodiment shown in FIG. 15 is that in the event of wear and damage the sealing means can be easily replaced from the front without the entire assembly having to be removed or dismantled for this purpose.

The applicant reserves the right to claim all the features disclosed in the application documents as essential to the invention in so far as they are individually or in combination novel over the prior art.

LIST OF REFERENCE NUMERALS 1 transforming device
2 transport wheel, transport device
4 blow mold
4a blow mold part
4c wall
5 stretching rod
6 blow mold support
6a blow mold part
7 cavity
8 blow station
9 guide curve
10 plastic parisons
10a container
11 follower device
12 carriage
13 base
14 first structural part
15 sealing means, sealing lip
15a region
16 second structural part
17 cover
18 wall
19 side wall, section
20 clean room
21 holder
22 delivery unit
23 holding device
24 discharge unit
25 sealing means
26 carrier
27 sealing means
28 section
29 holding member
30 heater
31 heating elements
32 sterilising unit
33 screws
33a sealing disc
34 transport device
35 locking mechanism
35a locking plate
35b projections
36 transfer unit
37 transport wheel
38 sealing lip
40 filling unit
42 transfer unit
44 transport unit
50 plant
52 end portion of the sealing means
54 groove
56, 58 couplings
60 supply unit
62 mold support shell
64 gap
65 gap
66 sealing means
78 recess
80 recess
82 side wall
83 section
84 side wall
87 recess base
92 projections
94 cooling medium bores
95 heat conducting elements
114, 116 components (prior art)
130 sealing means (prior art)
135 gap (prior art)
140 groove (prior art)
DF sealing surface
h1, h2 heights
L line
P arrow
S pivot axis
X axis
Y direction
U surrounding environment
Q cross-section

The invention claimed is:

1. A device (1) for transforming plastic parisons (10) into plastic containers (10a) with a plurality of transforming stations (8) which are disposed on a movable carrier (2), wherein the transforming stations (8) each have blow molds (4), within which the plastic parisons (10) can be transformed into plastic containers by a supply of a flowable medium (10a), and blow mold supports (6) for holding these blow molds (4), and wherein the blow mold supports (6) have at least two blow mold support parts (6a) which are movable relative to one another for opening and closing the blow molds (4), with a clean room (20) which is demarcated with respect to the surroundings (U) by means of at least one wall (18) and which at least partially surrounds the individual transforming stations (8), so that the transforming stations (8) are movable within this clean room (20), and with at least one supply unit (60) in order to supply flowable sterilising medium to at least one region of the transforming stations (8) which are movable within the clean room (20), wherein at least one transforming station (8) has at least two components (14, 16) which are permanently fastened to one another in a working operation, and a resilient sealing means (15) is disposed between these components, wherein this sealing means (15) fills and/or closes a gap formed between these components (14, 16) in such a way that the sealing means (15) can be supplied directly with the sterilising medium.

2. The device as claimed in claim 1, wherein the sealing means (15) is designed as a peripheral sealing means (15).

3. The device as claimed in claim 2, wherein the sealing means (15) is of annular construction.

4. The device (1) as claimed claim 1, with a plurality of sealing means (15) which can be supplied directly with the sterilising medium.

5. The device as claimed in claim 1, wherein at least one of the components (14) has a receiving recess (80) to accommodate the sealing means (15).

6. The device as claimed in claim 5, wherein the receiving recess (80) is peripheral.

7. The device as claimed in claim 5, wherein the receiving recess (80) has boundary walls (82, 84), wherein these boundary walls have different heights (h1, h2) with respect to the base (87) of the receiving recess.

8. The device as claimed in claim 1, wherein the sealing means (15) is made from a plastic.

9. The device as claimed in claim 8, wherein the sealing means (15) is made from an elastomer or a thermoplastic.

10. The device as claimed in claim 1, wherein in an assembled state of the components (14, 16) the sealing means (15) has an asymmetrical cross-section (Q).

11. The device as claimed in claim 1, wherein at least one of the components (14, 16) has at least one cylindrical raised area (35b) for connection to the other component (16, 14).

12. The device as claimed in claim 1, wherein the first component is a mold support and the second component is a blow mold part.

13. The device as claimed in claim 1, wherein delivery means for delivering a temperature control medium are disposed within a section surrounded by the sealing means (15).

14. A method of transforming plastic parisons (10) into plastic containers (10a) with a plurality of transforming stations (8) which are disposed on a movable carrier (2) comprising:
transforming the plastic parisons (10) into plastic containers by a supply of a flowable medium (10a) within the transforming stations (8) each having blow molds (4);
providing blow mold supports (6) for holding the blow molds (4);
opening and closing the blow molds (4) by moving at least blow mold support parts (6a, 6b) relative to one another;
at least partially surrounding the individual transforming stations (8) with a clean room (20) which is demarcated with respect to the surroundings (U) by means of at least one wall (18);
moving the transforming stations (8) with at least one supply unit (60) which supplies flowable sterilising medium to at least one region of the transforming stations (8) within the clean room (20); and
wherein at least one transforming station (8) has at least two components (14, 16) which are permanently fastened to one another in a working operation, and a resilient sealing means (15) is disposed between these components, wherein this sealing means (15) fills a gap formed between these components (14, 16) in such a way that the sealing means (15) is supplied directly with the sterilising medium.

15. The device as claimed in claim 1, wherein the sealing means forms a part of a surface, which forms a transition from the first structural part into the second structural part.

16. The device as claimed in claim 1, wherein the sealing means is formed on an external periphery of the surface which forms a transition from the first structural part into the second structural part.

17. The device as claimed in claim 1, wherein a drive shaft of the device is not disposed in the sterile room.

18. The device as claimed in claim 1, wherein the sterile room surrounds the individual transforming stations in the form of a channel.

19. The device as claimed in claim 1, wherein the sterile room has two walls which are movable relative to one another.

20. The device as claimed in claim 19, wherein the two walls are sealed against one another.

21. The method according to claim 14, wherein is demarcated with respect to the surroundings (U) by means of at least two walls, which are moved with respect to each other.

* * * * *